US008667598B2

(12) United States Patent
Takenouchi et al.

(10) Patent No.: US 8,667,598 B2
(45) Date of Patent: Mar. 4, 2014

(54) REPRODUCTION RULE EVALUATION DEVICE, REPRODUCTION RULE EVALUATION METHOD, RECORDING MEDIUM AND PROGRAM

(75) Inventors: Takao Takenouchi, Tokyo (JP); Takeaki Minamizawa, Tokyo (JP); Naoko Ito, Tokyo (JP)

(73) Assignee: NEC Corporation, Tokyo (JP)

( * ) Notice: Subject to any disclaimer, the term of this patent is extended or adjusted under 35 U.S.C. 154(b) by 518 days.

(21) Appl. No.: 12/527,686

(22) PCT Filed: Mar. 3, 2008

(86) PCT No.: PCT/JP2008/053783
§ 371 (c)(1),
(2), (4) Date: Feb. 7, 2010

(87) PCT Pub. No.: WO2008/120523
PCT Pub. Date: Oct. 9, 2008

(65) Prior Publication Data
US 2010/0146632 A1    Jun. 10, 2010

(30) Foreign Application Priority Data

Mar. 29, 2007   (JP) .................................. 2007-089866

(51) Int. Cl.
*H04L 29/06* (2006.01)
*G06F 21/00* (2013.01)

(52) U.S. Cl.
USPC .......... 726/26; 726/1; 726/2; 726/27; 726/28; 726/29; 726/30; 726/31; 726/32; 726/33; 380/201; 380/202; 380/203; 380/234; 380/241; 380/242; 705/51; 705/54; 705/56; 705/57; 705/59; 725/22; 725/32; 725/34; 725/35; 725/36; 725/39; 725/40; 725/42; 725/43

(58) Field of Classification Search
USPC .................. 726/1, 2, 26–30; 725/22, 32–43; 380/200–203, 231–234, 239–242; 705/50–59
See application file for complete search history.

(56) References Cited

U.S. PATENT DOCUMENTS 7,415,717 B1 *  8/2008  Nagumo ........................ 725/47
7,487,549 B2 *  2/2009  Kawamoto et al. ............. 726/27
(Continued)

FOREIGN PATENT DOCUMENTS

EP    1737236 A    12/2006
JP    2001128130 A    5/2001
(Continued)

OTHER PUBLICATIONS

Advertising versus pay-per-view in electronic media by Prasad et al; Publisher: Elsevier; Year: 2003.*
(Continued)

*Primary Examiner* — Madhuri Herzog
(74) *Attorney, Agent, or Firm* — Sughrue Mion, PLLC (57) ABSTRACT

When a viewer views content, it is reproduced by a reproduction procedure depending on a dynamic condition set in the content. Here, a content object data input unit obtains an externally-input content object. The content object is stored in a content object data retention unit, if necessary. The content object includes a reproduction rule and a content data. A reproduction rule evaluation and execution unit obtains the reproduction rule in the content object and performs processing in accordance with the reproduction rule. The reproduction unit reproduces a reproducible data specified by the reproduction rule evaluation and execution unit. An identifier management unit retains an identifier of a content object reproduction device and provides the identifier upon request. It is thus possible to reproduce in accordance with the reproduction rule set in the content object data and to control the reproduction procedure depending on the dynamic condition.

18 Claims, 10 Drawing Sheets

(56) References Cited

U.S. PATENT DOCUMENTS

| | | |
|---|---|---|
| 2001/0054181 A1 | 12/2001 | Corvin |
| 2002/0095592 A1* | 7/2002 | Daniell et al. ............... 713/200 |
| 2002/0107832 A1* | 8/2002 | Shimizu et al. .................. 707/1 |
| 2003/0149665 A1* | 8/2003 | Terada ........................... 705/40 |
| 2003/0231854 A1* | 12/2003 | Derrenberger ................. 386/46 |
| 2004/0133909 A1 | 7/2004 | Ma |
| 2005/0034163 A1* | 2/2005 | Nakagawa et al. ............. 725/88 |
| 2005/0108095 A1* | 5/2005 | Perlmutter ...................... 705/14 |
| 2005/0216932 A1* | 9/2005 | Danker .......................... 725/32 |
| 2007/0094687 A1* | 4/2007 | Russell .......................... 725/46 |
| 2007/0124201 A1* | 5/2007 | Hu et al. ........................ 705/14 |
| 2007/0136815 A1* | 6/2007 | Kasahara et al. ............... 726/26 |
| 2008/0098450 A1* | 4/2008 | Wu et al. ...................... 725/132 |

FOREIGN PATENT DOCUMENTS

| | | |
|---|---|---|
| JP | 2002268595 A | 9/2002 |
| JP | 2002318559 A | 10/2002 |
| JP | 2003006513 A | 1/2003 |
| JP | 2003051797 A | 2/2003 |
| JP | 2003078902 A | 3/2003 |
| JP | 2004005080 A | 1/2004 |
| JP | 2005191617 A | 7/2005 |
| JP | 2005204233 A | 7/2005 |
| JP | 2006060423 A | 3/2006 |
| JP | 2006304106 A | 11/2006 |
| JP | 2007148483 A | 6/2007 |
| WO | 03021940 A | 3/2003 |
| WO | 2004064012 A2 | 7/2004 |
| WO | 2005084140 A | 9/2005 |
| WO | 2005091163 A | 9/2005 |
| WO | 2006057256 A | 6/2006 |

OTHER PUBLICATIONS

Supplementary European Search Report for EP 08 72 1203 completed Apr. 13, 2011.

International Search Report for PCT/JP2008/053783 mailed Apr. 8, 2008.

Japanese Office Action for JP2009-507439 mailed on Dec. 11, 2012.

* cited by examiner

REPRODUCTION RULE EVALUATION DEVICE, REPRODUCTION RULE EVALUATION METHOD, RECORDING MEDIUM AND PROGRAM

TECHNICAL FIELD

The present invention relates to a reproduction rule evaluation device, particularly to a reproduction rule evaluation device for contents and CM (commercial message).

This application is the National Phase of PCT/JP2008/053783, filed Mar. 3, 2008, which is based upon and claims the benefit of priority from Japanese patent application No. 2007-089866, the disclosure of which is incorporated herein by reference.

BACKGROUND ART

An approach to insert advertisement into content such as video, movie and music to make the advertisement reproduced in exchange for free view of the content has been adopted in the past.

However, this approach requires interruption of reproduction of the content in order to make the advertisement viewed in the middle of the content.

In order to solve this, other approaches to make the viewing of the content and CM (commercial message) flexible have been considered, such as an approach to make the advertisement viewed prior to the content, an approach to equate looking at an advertisement on a home page with viewing the advertisement and the like.

As a related technique, Japanese Laid-Open Patent Application JP-2003-078902 discloses a CM information management device. In this related technique, a CM-configuration-table-added program management unit of a CM information management site receives a program request specifying a program name from a pay program receiving terminal and then transmits to the request source a CM-configuration-table-added program including video and audio information constituting a CM-inserted pay program and a CM-added program configuration table indicating the reproduction order. Also, when receiving a CM deletion request, it transmits a program configuration table in which the CM reproduction order is omitted to the pay program receiving terminal as the request source. If an input reception unit receives the CM deletion request from a viewer after a video and audio processing unit reproduces the CM-inserted pay program, the pay program receiving terminal obtains the program configuration table and reproduces the pay program in which the CM is omitted.

Japanese Laid-Open Patent Application JP-2005-191617 discloses a prior portion viewing method. This related technique is a prior portion viewing method in a prior portion viewing apparatus comprising an information server that provides a program service depending on a view history of a user through a communication line and a television broadcast recorder that is capable of communicating with the information server. According to the prior portion viewing method, the recorder notifies the information server of programmed recording information to obtain advertisement information. When the user views the advertisement, the view history is stored. The advertisement view history in the recorder is notified to the information server and thereby the associated program service is obtained.

However, according to the above-mentioned method, a reproduction procedure of the content is fixed and thus the reproduction procedure cannot be set depending on a dynamic condition.

As another related technique, Japanese Laid-Open Patent Application JP-2005-204233 discloses a digital broadcast receiving device. According to this related technique, the digital broadcast receiving device receives a transport stream including a content stream, a CM stream, a privilege video stream, and a program stream consisting of CM reproduction detection information for detecting CM stream reproduction and stream switching detection information indicating a timing for switching to a plurality of privilege video streams. The digital broadcast receiving device analyzes contents of the received transport stream and extracts the CM reproduction detection information and the stream switching detection information. When detecting the CM reproduction detection information, the digital broadcast receiving device creates a CM view history in which the number of CM viewed times is recorded. When detecting the stream switching detection information, the digital broadcast receiving device selects a privilege video stream from a privilege video list that designates the privilege video stream depending on the number of viewed times, and reproduces the selected privilege video stream.

Japanese Laid-Open Patent Application JP-2006-060423 discloses a program reproduction method, a program reproduction system and a recording and reproducing device. According to this related technique, when a broadcasted program is recorded and then reproduced, a screen image of an advertisement (commercial message) included in the program is skipped or a reproduction timing thereof is changed depending on an answer to a questionnaire. Since a method of reproducing the advertisement is determined depending on the answer to the questionnaire, it is possible to achieve a new program reproduction method where a viewer can continuously view the program content in exchange for the answer to the questionnaire that a company supporting the program desires for the viewer. That is, a broadcast device (broadcast station) adds the questionnaire at the beginning of the program and broadcasts the program. On the other hand, the recording and reproducing device reproduces the questionnaire, receives an answer from the viewer, and transmits the answer to a server. Consequently, the company supporting the program can easily obtain useful information (answer). Moreover, the recording and reproducing device changes a way of reproducing the advertisement (commercial message) to a direction desired by the viewer based on the transmitted answer and then reproduces the program. Therefore, a viewer's desire for the program reproduction is satisfied automatically.

Japanese Laid-Open Patent Application JP-2006-304106 discloses a digital television system, a printing method and a program. According to this related technique, a digital television content producer includes a program ID, a point data corresponding to the program ID, a print image and a print controlling script in an attached data of a digital television signal, and then transmits it. The digital television signal is received by a digital signal receiving device and is separated into a video section and a data section by a data separation device, and they are respectively transmitted to a video decoder unit and a CPU for processing. The attached data of the digital television signal transmitted to the CPU includes the program ID, the point data corresponding to the program ID, the print image and the print controlling script. The CPU automatically executes the print controlling script to store a CM point of a viewer and make a judgment of printing. If the viewer satisfies a printing condition, the CPU transmits the print image to a printer to execute the printing.

DISCLOSURE OF INVENTION

An object of the present invention is to provide a reproduction rule evaluation device that evaluates a reproduction rule when reproducing content and reproduces the content and CM depending on a dynamic condition.

A reproduction rule evaluation device according to the present invention comprises: a content object data input means that obtains a content object including a reproduction rule and a content data; an identifier management means that retains an identifier of a terminal and provides the identifier upon request; and a reproduction rule evaluation and execution means that obtains the reproduction rule in the content object, performs an evaluation of the reproduction rule and performs processing in accordance with the reproduction rule.

A reproduction rule evaluation method according to the present invention comprises: a step of obtaining a content object including a reproduction rule and a content data to evaluate the reproduction rule in the content object; a step of obtaining a CM view history related to an identifier of a terminal to evaluate the CM view history; a step of obtaining a CM data, if a CM is unviewed as a result of the evaluation of the CM view history, to reproduce the CM and write the identifier and view history information indicating that the CM is viewed to the CM view history; and a step of obtaining the content data from the content object to reproduce content.

A recording medium according to the present invention stores a program that causes a computer to perform: a step of obtaining a content object including a reproduction rule and a content data to evaluate the reproduction rule in the content object; a step of obtaining a CM view history related to an identifier of a terminal to evaluate the CM view history; a step of obtaining a CM data, if a CM is unviewed as a result of the evaluation of the CM view history, to reproduce the CM and writes the identifier and view history information indicating that the CM is viewed to the CM view history; and a step of obtaining the content data from the content object to reproduce content.

A program according to the present invention causes a computer to perform: a step of obtaining a content object including a reproduction rule and a content data to evaluate the reproduction rule in the content object; a step of obtaining a CM view history related to an identifier of a terminal to evaluate the CM view history; a step of obtaining a CM data, if a CM is unviewed as a result of the evaluation of the CM view history, to reproduce the CM and writes the identifier and view history information indicating that the CM is viewed to the CM view history; and a step of obtaining the content data from the content object to reproduce content.

It is thus possible to reproduce in accordance with the reproduction rule set in the content object data and to control the reproduction procedure depending on the dynamic condition.

BEST MODE FOR CARRYING OUT THE INVENTION

According to the present invention, when a viewer views a content, it is reproduced by a reproduction procedure depending on a dynamic condition set in the content.

A first exemplary embodiment of the present invention will be described below with reference to the attached drawings.

Figure 1:
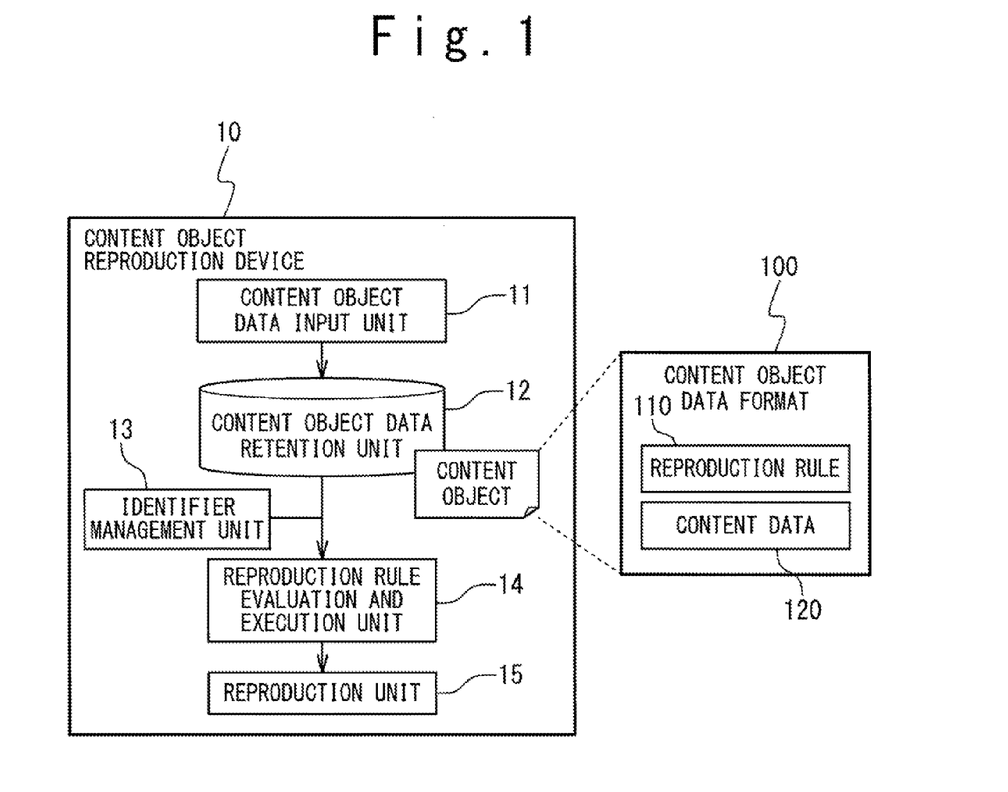
FIG. 1 is a block diagram showing a content object reproduction device.

Referring to FIG. 1, a content object reproduction device 10 is provided with a content object data input unit 11, a content object data retention unit 12, an identifier management unit 13, a reproduction rule evaluation and execution unit 14 and a reproduction unit 15. It may not have the content object data retention unit 12, if unnecessary.

The content object reproduction device 10 is a core device of a reproduction rule evaluation device of the present invention. The content object reproduction device 10 performs an evaluation of a reproduction rule and processes a content data in accordance with the reproduction rule.

The content object data input unit 11 is a device that stores a content object 100, which is externally input from an external memory device such as an SD card (Secure Digital memory card), a communication device such as a wireless LAN (Local Area Network) and the like, in the content object data retention unit 12. It should be noted that, if the content object data retention unit 12 does not exist, the content object data input unit 11 transmits the content object 100 to the reproduction rule evaluation and execution unit 14. The content object data input unit 11 is exemplified by a read-out device such as a DVD drive, a network adapter such as a communication port, an USB (Universal Serial Bus), a slot (jack) and an NIC (Network Interface Card) and the like. However, it is not limited to those examples in practice.

The content object 100 includes a reproduction rule 110 and a content data 120. The reproduction rule 110 is information describing a reproduction condition and a reproduction procedure of content. For example, such reproduction condition and reproduction procedure as "reproduce the CM at the beginning if reproduction fee is unpaid", "reproduce at low image quality if a questionnaire is unanswered", "copy at low image quality to another terminal, if the CM is viewed" and the like can be the reproduction rule 110. The content data 120 is a data of content provided by a content provider, which is one of reproducible data. The content data 120 is exemplified by a video data, a still image data, an audio data and the like.

The content object data retention unit 12 is a device that retains the content object 100. In a case where there is no need to hold the content object, for example in a case of streaming delivery, the content object data retention unit 12 may not exist. The content object data retention unit 12 is exemplified by a memory device such as a memory and a storage, a recording medium (media) and the like. However, it is not limited to those examples in practice.

The identifier management unit 13 is a device that retains an identifier of the content object reproduction device 10 and provides the identifier upon request. The identifier management unit 13 is exemplified by a memory device such as a memory and a storage, a recording medium (media) and the like. However, it is not limited to those examples in practice.

The reproduction rule evaluation and execution unit 14 is a device that obtains the reproduction rule 110 in the content object 100 from the content object data input unit 11 or the content object data retention unit 12 and performs processing in accordance with the reproduction rule 110. The reproduction rule evaluation and execution unit 14 is exemplified by a processing device such as a CPU (Central Processing Unit), a microprocessor and the like. The reproduction rule evaluation and execution unit 14 may be a dedicated-hardware having a function of the reproduction rule evaluation and execution unit 14, a program that causes a computer to achieve the function of the reproduction rule evaluation and execution unit 14, or the like. However, it is not limited to those examples in practice.

The reproduction unit 15 is a device that reproduces a reproducible data specified by the reproduction rule evaluation and execution unit 14. The reproducible data means a data that the reproduction unit 15 is able to reproduce. The reproduction unit 15 is exemplified by a display device such as a liquid crystal display, a projection device such as a projector and the like. However, it is not limited to those examples, in practice.

By using these devices, it is possible to reproduce in accordance with the reproduction rule 110 set in the content object 100. It is thus possible to control the reproduction procedure depending on the dynamic condition, which has not been achieved in the past.

Figure 2:
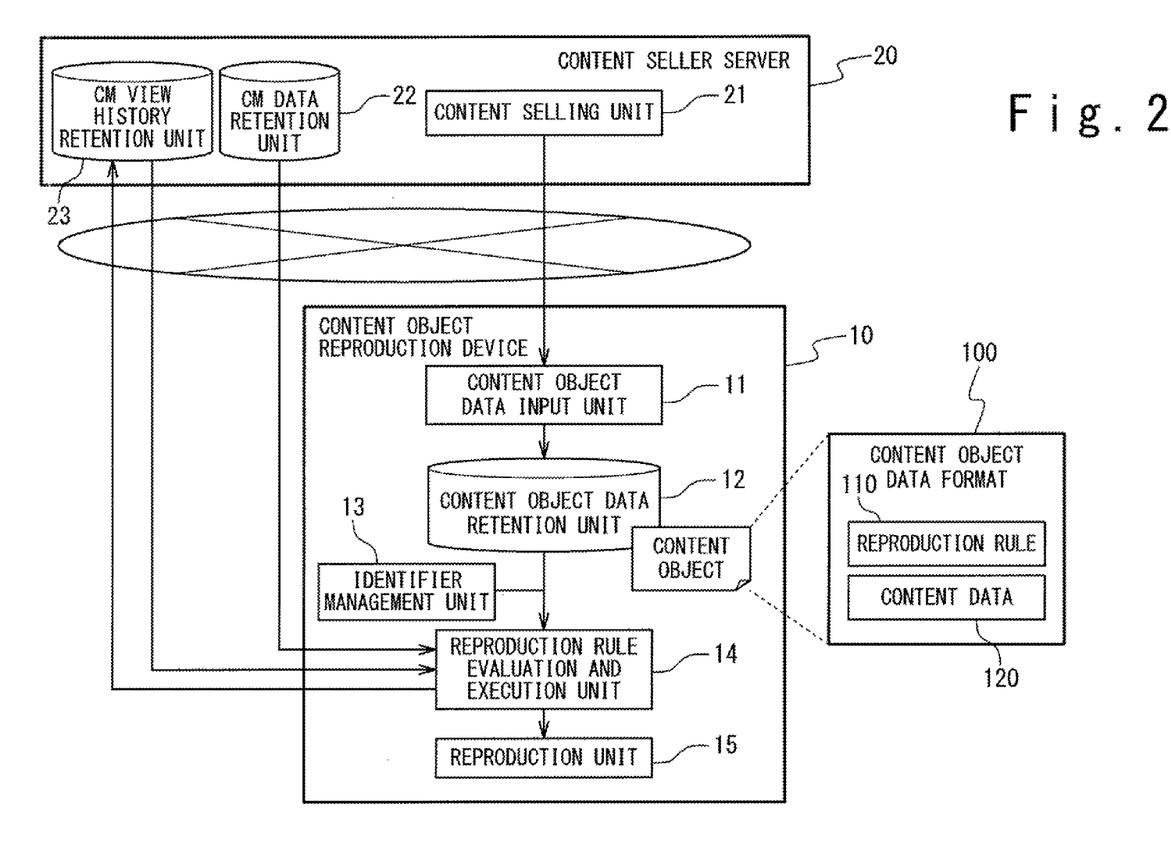
FIG. 2 is a view for explaining a first exemplary embodiment of the present invention.

FIG. 2 is a schematic showing a reproduction rule evaluation system according to the present invention. Shown here is an example where an Internet service provider selling video content of movie picture develops services by using the present invention.

The reproduction rule evaluation system according to the present invention includes the content object reproduction device 10 and a content seller server 20. The content object reproduction device 10 and the content seller server 20 are connected via a network.

The content object reproduction device 10 is provided with the content object data input unit 11, the content object data retention unit 12, the identifier management unit 13, the reproduction rule evaluation and execution unit 14 and the reproduction unit 15. It may not have the content object data retention unit 12, if unnecessary.

The content object data input unit 11 obtains the content object 100 from a content selling unit 21 and transmits it to the content object data retention unit 12. It should be noted that, if the content object data retention unit 12 does not exist, the content object data input unit 11 transmits the content object 100 to the reproduction rule evaluation and execution unit 14.

The content object data retention unit 12 receives the content object 100 from the content object data input unit 11 and retains it. In a case where there is no need to hold the content object, for example in a case of streaming delivery, the content object data retention unit 12 may not exist.

The identifier management unit 13 retains the identifier of the content object reproduction device 10 and provides the identifier upon request. Here, the identifier is a terminal ID. The terminal is the content object reproduction device 10. In practice, the identifier can be any identification information as long as the terminal can be identified. For example, the identifier can be an IP address and the like.

The reproduction rule evaluation and execution unit 14 obtains the reproduction rule 110 in the content object 100 from the content object data input unit 11 or the content object data retention unit 12, and performs processing in accordance with the reproduction rule 110. The reproduction rule 110 includes description that means "reproduce content after reproducing CM if the CM is unviewed, and reproduce content without reproducing CM if the CM is already viewed". The reproduction rule 110 also includes information (e.g. URL) for referring to a CM data retention unit 22. Here, the reproduction rule evaluation and execution unit 14 obtains the identifier from the identifier management unit 13, transmits the identifier to a CM view history retention unit 23, and obtains a CM view history related to the identifier from the CM view history retention unit 23 to perform processing. If the CM is unviewed, the reproduction rule evaluation and execution unit 14 transmits a CM data and the content data 120 to the reproduction unit 15. If the CM is already viewed, the reproduction rule evaluation and execution unit 14 transmits the content data 120 to the reproduction unit 15. Here, the CM data, which is one of the reproducible data, is desired to be viewed in the case where the content is viewed.

The reproduction unit 15 receives and reproduces the reproducible data. Here, the reproducible data includes the CM data and the content data 120.

The content seller server 20 is provided with the content selling unit 21, the CM data retention unit 22 and the CM view history retention unit 23.

The CM data retention unit 22 retains the CM data and provides the. CM data upon request.

The CM view history retention unit 23 retains the CM view history related to the terminal ID (identifier) and provides he CM view history upon request.

In the reproduction rule evaluation system according to the present invention, when a user purchases content of a movie picture for example, the user performs an input operation with respect to the content object data input unit 11. In this case, the content of the movie picture is the content object 100. In response to the input operation, the content object data input unit 11 obtains the content object 100 from the content selling unit 21 and stores it in the content object data retention unit 12. The reproduction rule evaluation and execution unit 14 performs an evaluation of the reproduction rule 110 included in the stored content object 100. After that, the reproduction unit 15 reproduces the content by using the content data 120 included in the stored content object 100.

Here, the reproduction rule 110 is "reproduce content after reproducing CM if the CM is unviewed, and reproduce content without reproducing CM if the CM is already viewed". Therefore, the reproduction rule evaluation and execution unit 14 obtains the identifier from the identifier management unit 13, provides the CM view history retention unit 23 with the obtained identifier, obtains the CM view history related to the identifier from the CM view history retention unit 23, refers to the obtained CM view history to check whether or not the CM is already viewed. If the CM is unviewed, the reproduction rule evaluation and execution unit 14 determines to reproduce the CM before reproducing the content. If the CM is already viewed, he reproduction rule evaluation and execution unit 14 determines to reproduce the content without reproducing the CM. When the CM and/or the content is determined to be reproduced, the reproduction rule evaluation and execution unit 14 transmits the CM data and/or the content data 120 to the reproduction unit 15.

Figure 3:
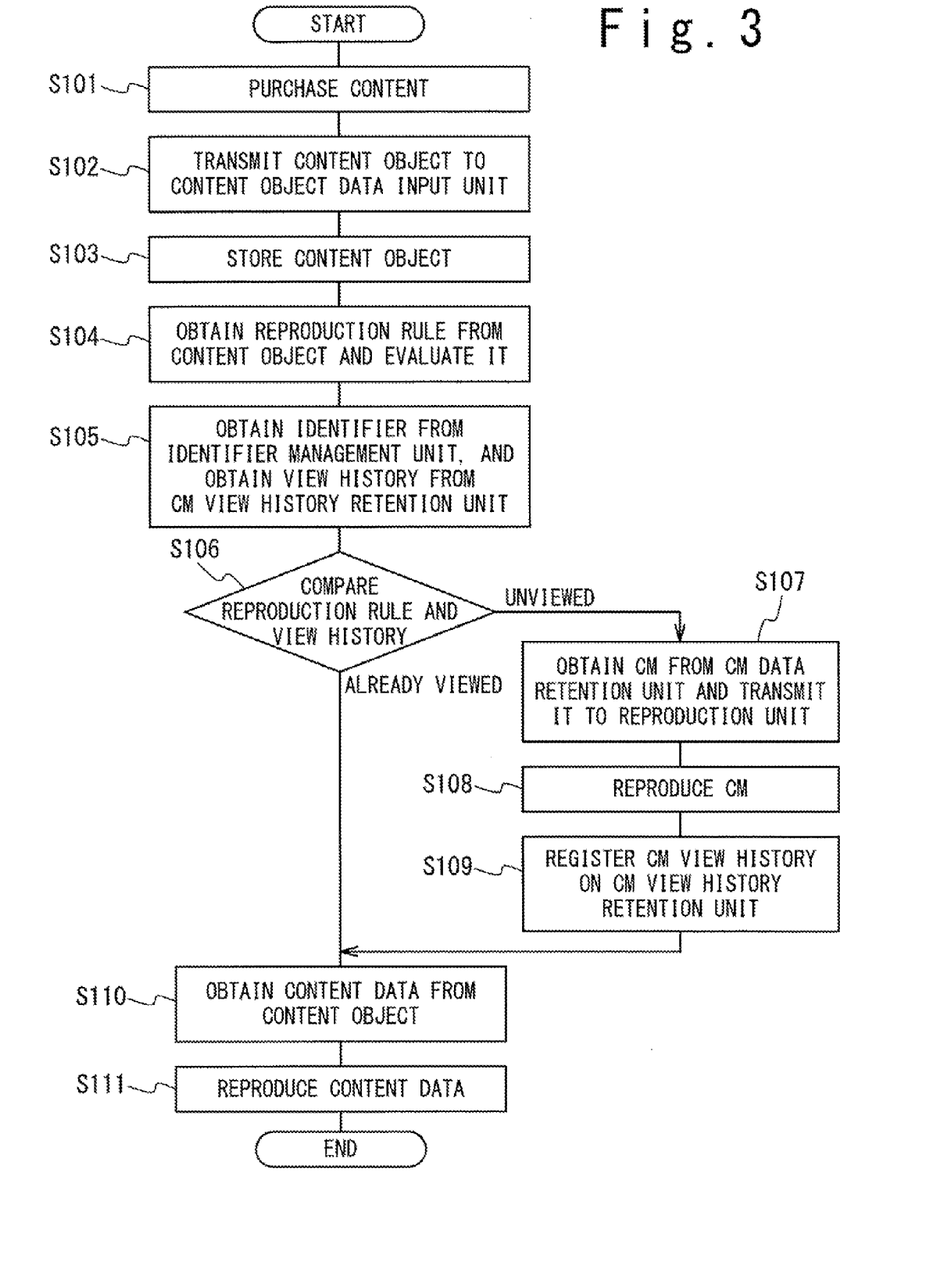
FIG. 3 is a flow chart showing an operation flow in the present invention.

FIG. 3 is a flow chart showing an operation flow of the reproduction rule evaluation system according to the present invention.

(1) Step S101

A content viewer accesses the content selling unit 21 and purchases content.

(2) Step S102

The content selling unit 21 transmits the content purchased by the user as the content object 100 to the content object data input unit 11.

(3) Step S103

The content object data input unit 11 stores the received content object 100 in the content object data retention unit 12. In a case where there is no need to hold the content object 100 and the content object data retention unit 12 does not exist, for example in a case of streaming delivery, the content object data input unit 11 transmits the content object 100 to the reproduction rule evaluation and execution unit 14.

(4) Step S104

The reproduction rule evaluation and execution unit 14 obtains the content object 100 from the content object data input unit 11 or the content object data retention unit 12, and evaluates the reproduction rule 110 in the content object 100.

(5) Step S105

Since a condition regarding the CM viewing is described in the reproduction rule 110, the reproduction rule evaluation and execution unit 14 obtains the terminal ID (identifier) from the identifier management unit 13, and refers to the CM view history retention unit 23 to obtain the CM view history related to the terminal ID (identifier).

(6) Step S106

The reproduction rule evaluation and execution unit 14 evaluates the CM view history. It the CM is already viewed, Step S110 is executed. If the CM is unviewed, Step S107 is executed.

(7) Step S107

In the case where the CM is unviewed, the reproduction rule evaluation and execution unit 14 obtains the CM data from the CM data retention unit 22 and transmits it to the reproduction unit 15.

(8) Step S108

The reproduction unit 15 receives the CM data and reproduces the CM.

(9) Step S109

The reproduction rule evaluation and execution unit 14 registers the terminal ID (identifier) and view history information indicating that the CM is viewed on the CM view history retention unit 23. The CM view history becomes "CM is already viewed".

(10) Step S110

In the case where the CM is already viewed, the reproduction rule evaluation and execution unit 14 obtains the content data 120 from the content object 100 and transmits it to the reproduction unit 15.

(11) Step S111

The reproduction unit 15 receives the content data 120 and reproduces the content.

In this manner, the reproduction procedure can be set depending on the reproduction rule 110 and the dynamic condition. Moreover, a content provider can variously set the reproduction rule 110 for the content. Furthermore, a user can reproduce the content in accordance with the various reproduction rules 110.

Next, a second exemplary embodiment of the present invention will be described below.

Although a basic configuration of the second exemplary embodiment of the present invention is the same as that of the first exemplary embodiment of the present invention, a method of obtaining the CM data is changed.

Figure 4:
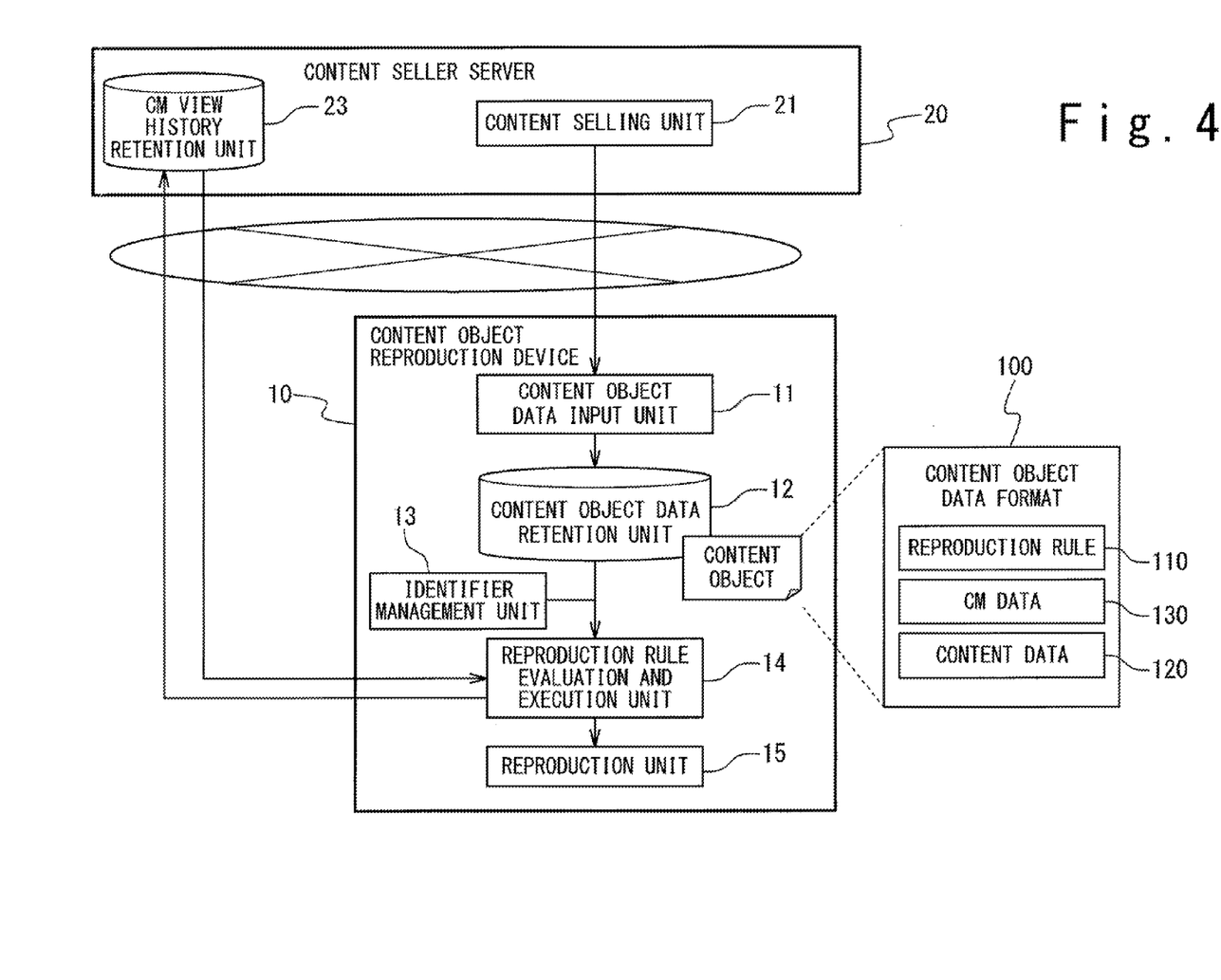
FIG. 4 is a view for explaining a second exemplary embodiment of the present invention.

In the first exemplary embodiment, the CM data retention unit 22 of the content seller server 20 retains the CM data. In the present exemplary embodiment, the CM data is stored in the content object 100.

FIG. 4 is a schematic showing a reproduction rule evaluation system according to the present exemplary embodiment.

The reproduction rule evaluation system in the present exemplary embodiment includes the content object reproduction device 10 and the content seller server 20. The content object reproduction device 10 is the same as in the first exemplary embodiment.

The content seller server 20 includes the content selling unit 21 and the CM view history retention unit 23. The content object 100 includes the reproduction rule 110, the content data 120 and the CM data 130.

As describe above, in the present exemplary embodiment, the content seller server 20 does not have the CM data retention unit 22, and the CM data 130 is included in the content object 100.

When the CM data is required to be reproduced as a result of the judgment by the reproduction rule evaluation and execution unit 14, a request for the CM data is sent to the CM data retention unit 22 of the content seller server 20 in the case of the first exemplary embodiment, while in the present exemplary embodiment, the CM data is stored in the content object 100 and is obtained from the content object 100. A location of the CM data is described in the reproduction rule 110.

Next, a third exemplary embodiment of the present invention will be described below.

The third exemplary embodiment of the present invention is characterized by copying the content to another terminal without reproducing the content.

Figure 5:
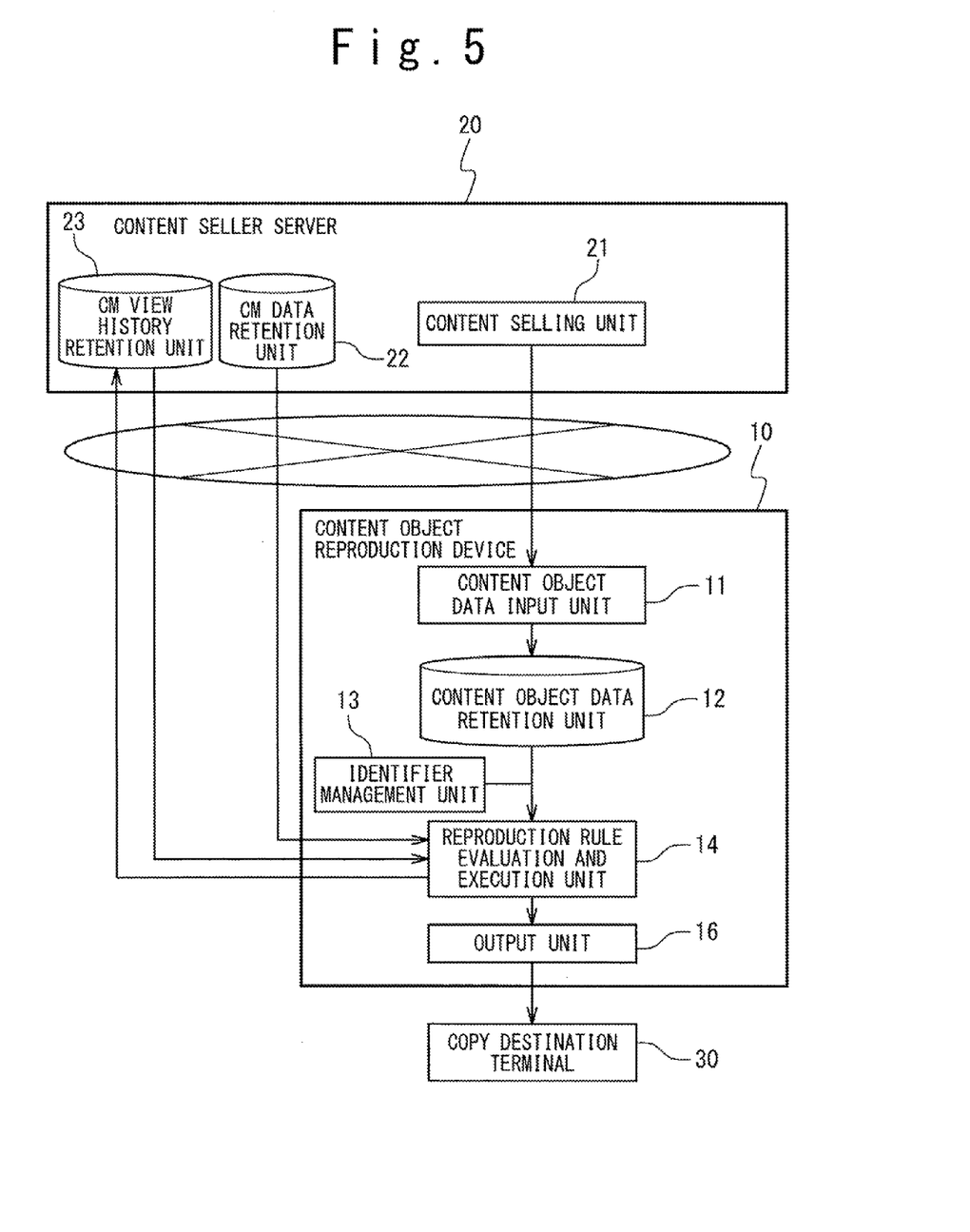
FIG. 5 is a view for explaining a third exemplary embodiment of the present invention.

FIG. 5 is a schematic showing a reproduction rule evaluation system according to the present exemplary embodiment.

The reproduction rule evaluation system in the present exemplary embodiment includes the content object reproduction device 10, the content seller server 20 and a copy destination terminal 30. The content seller server 20 is the same as in the first exemplary embodiment. The copy destination terminal 30 is another terminal that receives an output data from the content object reproduction device 10.

The content object reproduction device 10 is provided with the content object data input unit 11, the content object data retention unit 12, the identifier management unit 13, the reproduction rule evaluation and execution unit 14 and an output unit 16. It may not have the content object data retention unit 12, if unnecessary.

In the present exemplary embodiment, the reproduction unit 15 is changed to the output unit 16. It should be noted that both of the reproduction unit 15 and the output unit 16 may be provided in practice.

The output unit 16 receives the data of the content from the reproduction rule evaluation and execution unit 14 and transmits the data to the copy destination terminal 30. The output unit 16 is exemplified by a network adapter such as an NIC (Network Interface Card), an antenna, a modem (MODEM), a communication port, an USB (Universal Serial Bus), a slot (jack) and the like. However, it is not limited to those examples in practice.

In this manner, it is possible to execute the reproduction rule 110 that indicates copying to the copy destination terminal 30, such as "copy to another terminal if the CM is already viewed".

Next, a fourth exemplary embodiment of the present invention will be described below.

The fourth exemplary embodiment of the present invention is characterized by reproducing the content after changing image quality of the content. Also, a scheme to cache the post-change data may be provided.

Figure 6:
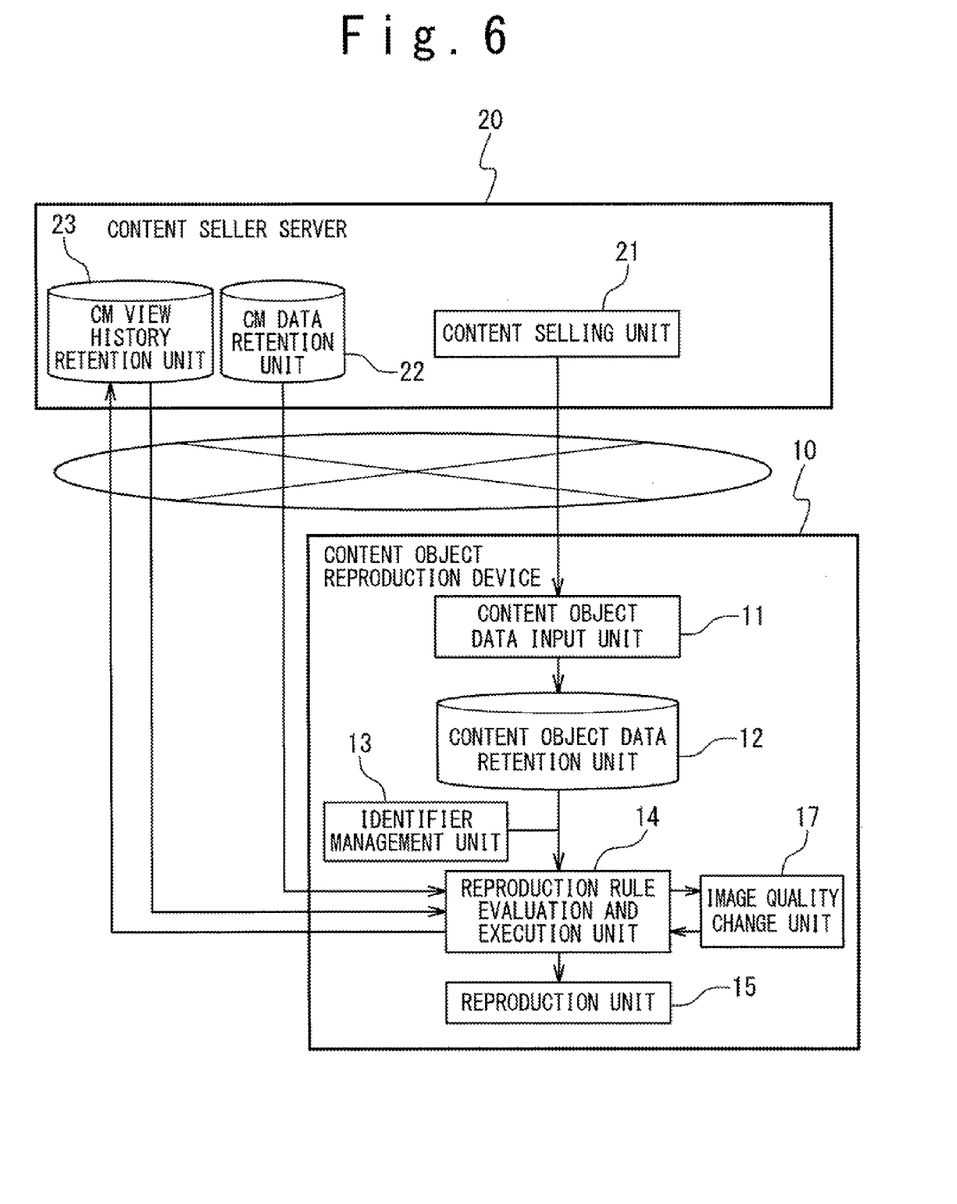
FIG. 6 is a view for explaining a fourth exemplary embodiment of the present invention.

FIG. 6 is a schematic showing a reproduction rule evaluation system according to the present exemplary embodiment.

The reproduction rule evaluation system in the present exemplary embodiment includes the content object reproduction device 10 and the content seller server 20. The content seller server 20 is the same as in the first exemplary embodiment.

The content object reproduction device 10 is provided with the content object data input unit 11, the content object data retention unit 12, the identifier management unit 13, the reproduction rule evaluation and execution unit 14, the reproduction unit 15 and an image quality change unit 17. It may not have the content object data retention unit 12, if unnecessary.

In this manner, the image quality change unit 17 is added in the present exemplary embodiment.

The image quality change unit 17 receives an instruction to change the image quality of the content and the data of the content from the reproduction rule evaluation and execution unit 14, changes the image quality of the content, and returns it back to the reproduction rule evaluation and execution unit 14. Moreover, the image quality change unit 17 may cache the post-change data as necessary. The image quality change unit 17 is exemplified by a processing device such as a CPU, a microprocessor and the like. The image quality change unit 17 may be a dedicated-hardware having a function of the image quality change unit 17, a program that causes a computer to achieve the function of the image quality change unit 17, or the like. However, it is not limited to those examples in practice.

In this manner, it is possible to execute the reproduction rule 110 that indicates changing the image quality, such as "reproduce at the low image quality if the CM is already viewed".

Next, a fifth exemplary embodiment of the present invention will be described below.

The fifth exemplary embodiment of the present invention is characterized in that DRM (Digital Rights Management) setting of the content can be changed.

Figure 7:
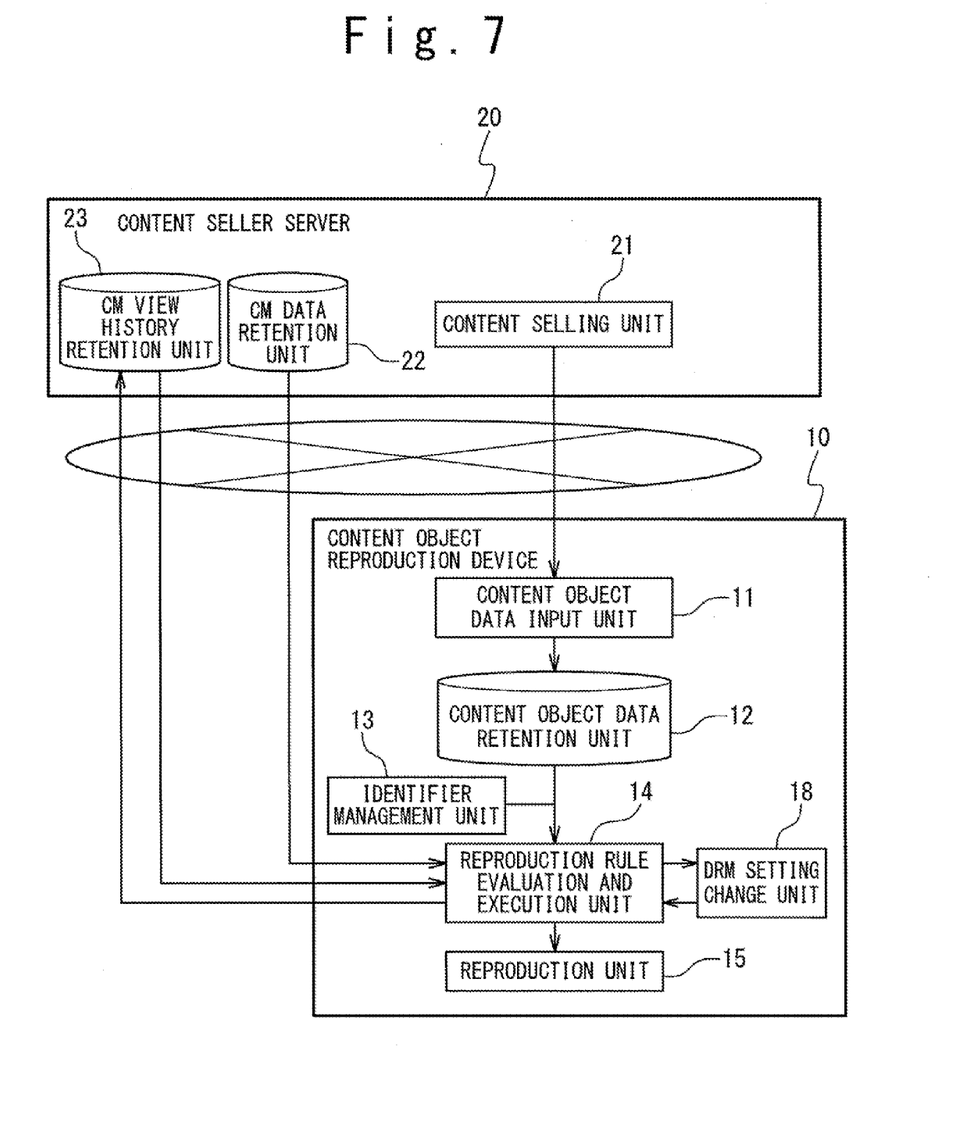
FIG. 7 is a view for explaining a fifth exemplary embodiment of the present invention.

FIG. 7 is a schematic showing a reproduction rule evaluation system according to the present exemplary embodiment.

The reproduction rule evaluation system in the present exemplary embodiment includes the content object reproduction device 10 and the content seller server 20. The content seller server 20 is the same as in the first exemplary embodiment.

The content object reproduction device 10 is provided with the content object data input unit 11, the content object data retention unit 12, the identifier management unit 13, the reproduction rule evaluation and execution unit 14, the reproduction unit 15 and a DRM setting change unit 18. It may not have the content object data retention unit 12, if unnecessary.

In this manner, the DRM setting change unit 18 is added in the present exemplary embodiment.

The DRM setting change unit 18 receives an instruction to change the DRM setting and the data of the content from the reproduction rule evaluation and execution unit 14, changes the DRM setting, and returns it back to the reproduction rule evaluation and execution unit 14. The DRM setting change unit 18 is exemplified by a processing device such as a CPU, a microprocessor and the like. The DRM setting change unit 18 may be a dedicated-hardware having a function of the DRM setting change unit 18, a program that causes a computer to achieve the function of the DRM setting change unit 18, or the like. However, it is not limited to those examples in practice.

In this manner, it is possible to execute the reproduction rule 110 that indicates changing the DRM setting, such as "increase the limited number of copy times of the DRM, if the CM is already viewed". For example, the reproduction rule 110 such as "perform DRM copy restriction and copy to another terminal, if the CM is viewed" enables that the DRM copy restriction is always set when copying to another terminal.

Next, a sixth exemplary embodiment of the present invention will be described below.

The sixth exemplary embodiment of the present invention is characterized in that the setting can be changed such that the CM need not be viewed if a questionnaire is answered.

Figure 8:
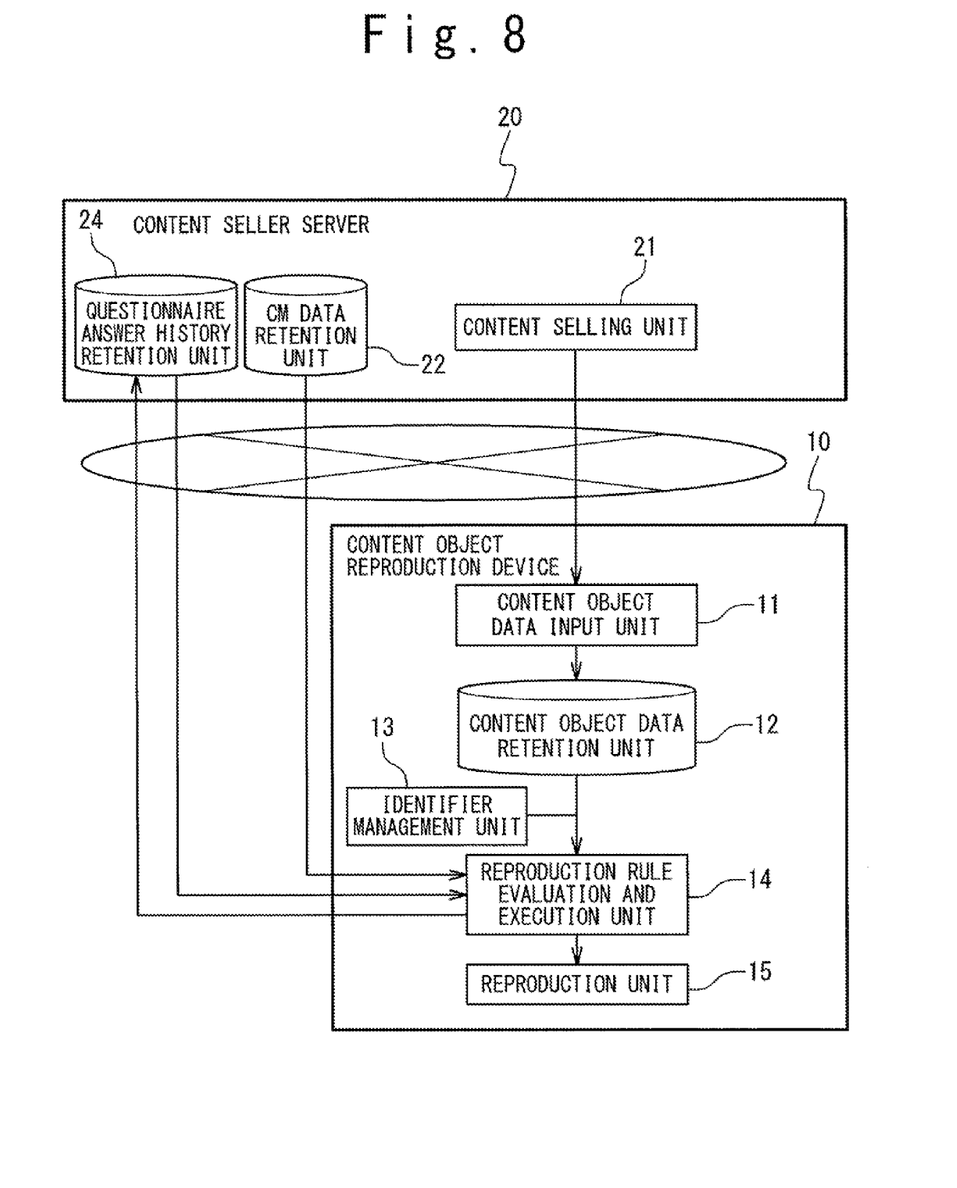
FIG. 8 is a view for explaining a sixth exemplary embodiment of the present invention.

FIG. 8 is a schematic showing a reproduction rule evaluation system according to the present exemplary embodiment.

The reproduction rule evaluation system in the present exemplary embodiment includes the content object reproduction device 10 and the content seller server 20. The content object reproduction device 10 is the same as in the first exemplary embodiment.

The content seller server 20 includes the content selling unit 21, the CM data retention unit 22 and a questionnaire answer history retention unit 24.

In this manner, according to the present exemplary embodiment, the questionnaire answer history retention unit 24 is added instead of the CM view history retention unit 23.

A questionnaire answer history and the terminal ID (identifier) are related to each other and they are stored in the questionnaire answer history retention unit 24.

The reproduction rule evaluation and execution unit 14 refers to the questionnaire answer history stored in the questionnaire answer history retention unit 24 to judge whether or not to transmit the CM data obtained from the CM data retention unit 22 to the reproduction unit 15.

At this time, the reproduction rule evaluation and execution unit 14 may distribute questionnaire data stored in the questionnaire answer history retention unit 24 via the reproduction unit 15 with respect to each terminal and obtain the answer to the questionnaire.

In this manner, it is possible to execute the reproduction rule 110 that depends on whether or not the questionnaire is already answered, such as "make the CM viewed if the questionnaire is not yet answered".

Next, a seventh exemplary embodiment of the present invention will be described below.

The seventh exemplary embodiment of the present invention is characterized in that the setting can be changed such that the CM need not be viewed if merchandise is purchased.

Figure 9:
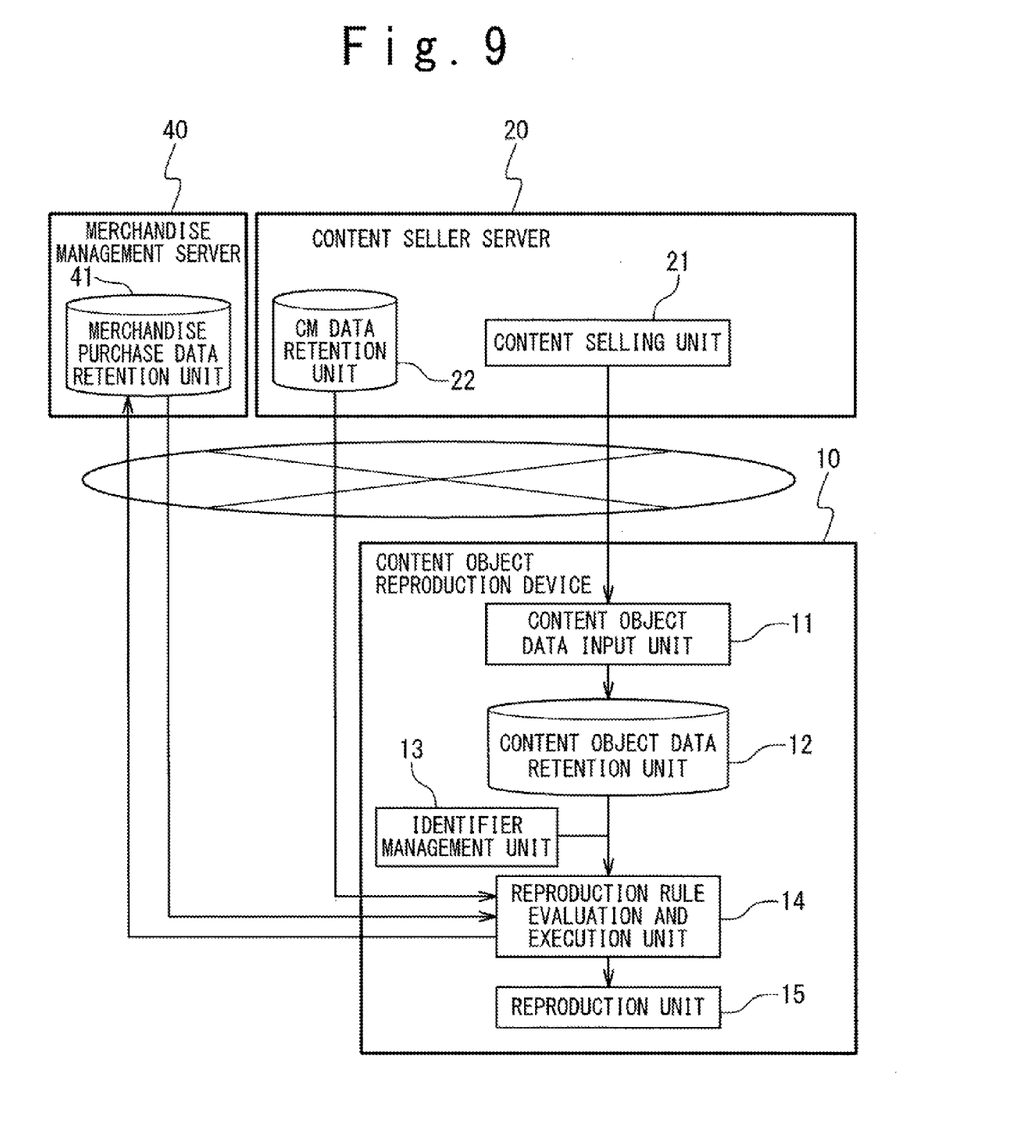
FIG. 9 is a view for explaining a seventh exemplary embodiment of the present invention.

FIG. 9 is a schematic showing a reproduction rule evaluation system according to the present exemplary embodiment.

The reproduction rule evaluation system in the present exemplary embodiment includes the content object reproduction device 10, the content seller server 20 and a merchandise management server 40. The content object reproduction device 10 is the same as in the first exemplary embodiment.

The content seller server 20 is provided with the content selling unit 21 and the CM data retention unit 22.

The merchandise management server 40 is provided with a merchandise purchase data retention unit 41.

In practice, the content seller server 20 and the merchandise management server 40 may be the same server. That is to say, the content seller server 20 may be provided with the merchandise purchase data retention unit 41.

In this manner, according to the present exemplary embodiment, the merchandise purchase data retention unit 41 is added instead of the CM view history retention unit 23.

A merchandise purchase history and the terminal ID (identifier) are related to each other and they are stored in the merchandise purchase data retention unit 41. The present exemplary embodiment cooperates with merchandise purchase data and the POS system of stores by another mechanism, and the terminal ID (identifier) and the purchase history are stored in the merchandise purchase data retention unit 41 when a user purchases merchandise.

In this manner, it is possible to execute the reproduction rule 110 that depends on whether or not the merchandise was purchased, such as "skip the viewing of the CM, if the merchandise was purchased".

Next, an eighth exemplary embodiment of the present invention will be described below.

The eighth exemplary embodiment of the present invention is characterized by cooperating with a plurality of terminals.

Figure 10:
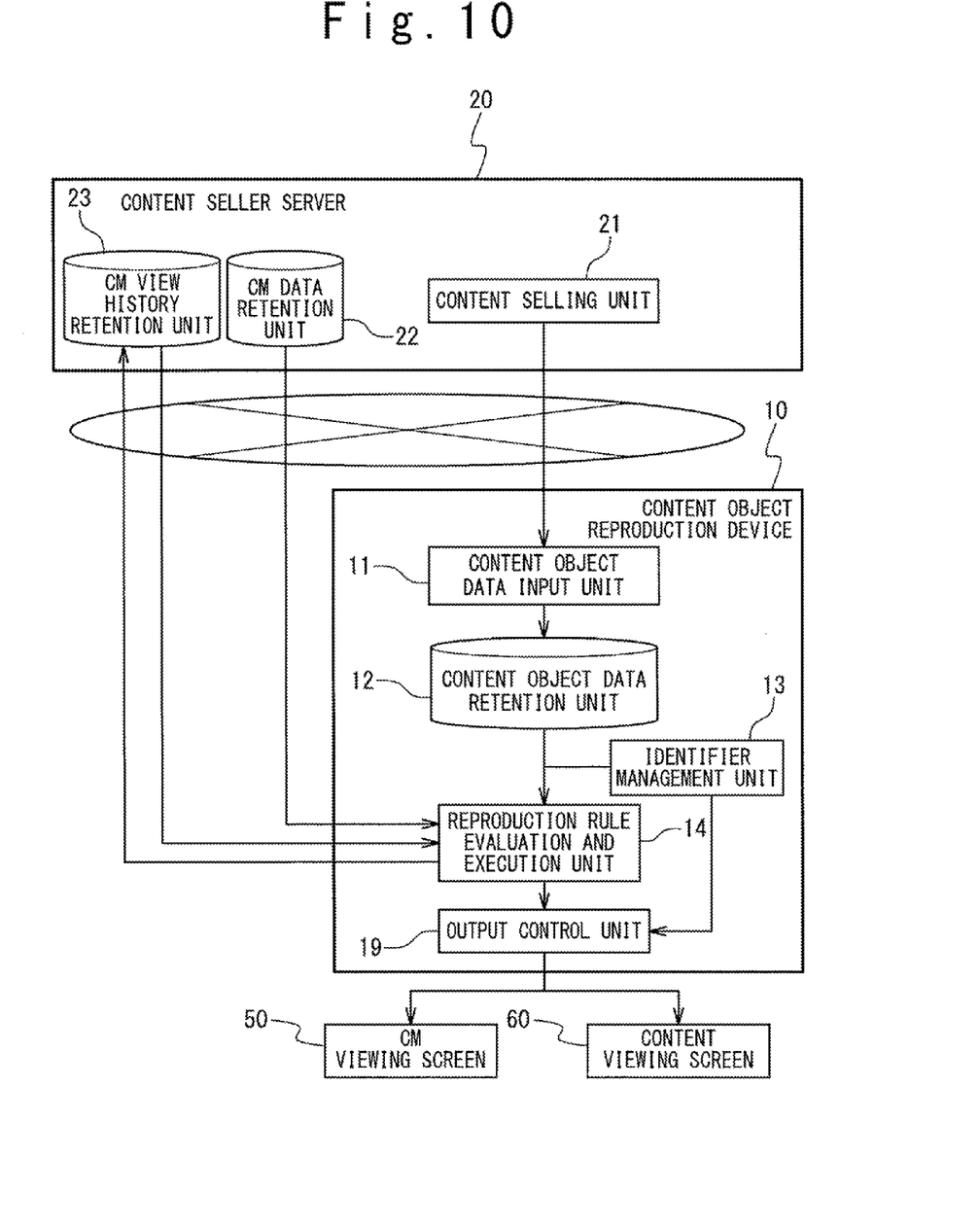
FIG. 10 is a view for explaining an eighth exemplary embodiment of the present invention.

FIG. 10 is a schematic showing a reproduction rule evaluation system according to the present exemplary embodiment.

The reproduction rule evaluation system in the present exemplary embodiment includes the content object reproduction device 10, the content seller server 20, a CM viewing screen 50 and a content viewing screen 60. The content seller server 20 is the same as in the first exemplary embodiment.

The content object reproduction device 10 is provided with the content object data input unit 11, the content object data retention unit 12, the identifier management unit 13, the reproduction rule evaluation and execution unit 14 and an output control unit 19. It may not have the content object data retention unit 12, if unnecessary.

In this manner, according to the present exemplary embodiment, the output control unit 19 is added instead of the reproduction unit 15.

The output control unit 19 cooperates with the identifier management unit 13 to display the CM on the CM viewing screen 50 and the content on the content viewing screen 60. Here, the output control unit 19 receives the CM data and the content data from the reproduction rule evaluation and execution unit 14, displays the CM on the CM viewing screen 50 and displays the content on the content viewing screen 60. The output control unit 19 is exemplified by a processing device such as a CPU, a microprocessor and the like. The output control unit 19 may be a dedicated-hardware having a function of the output control unit 19, a program that causes a computer to achieve the function of the output control unit 19, or the like. In this case, the output control unit 19 displays the CM on the CM viewing screen 50 and displays the content on the content viewing screen 60 through a network adapter such as an NIC (Network Interface Card), an antenna, a modem (MODEM), a communication port, an USB (Universal Serial Bus), a slot (jack) and the like outputs the content. The output control unit 19 may be a communication interface connected to the content object reproduction device 10. However, it is not limited to those examples in practice.

According to the present exemplary embodiment, the method of managing the identifier is different from that in the first exemplary embodiment. Stored in the identifier management unit 13 are the identifier of a user and the identifier of one or more terminals owned by the user which are classified into for use in viewing the CM and for use in viewing the content. In other words, the identifier of a user terminal, the identifier of a CM view terminal and the identifier of a content view terminal are stored in the identifier management unit 13.

The CM view history that is related to the identifier of the user is stored in the CM view history retention unit 23.

When obtaining the CM view history, the reproduction rule evaluation and execution unit 14 obtains the identifier of the user from the identifier management unit 13 and then refers to the CM view history retention unit 23 to obtain the CM view history.

When outputting the reproducible data, the output control unit 19 obtains a list of the identifiers of the terminals owned by the user from the identifier management unit 13. If the data to be reproduced is the CM, the data is reproduced in the CM view terminal. If the data to be reproduced is the content, the content is reproduced in the content view terminal.

Consequently, the terminal for use in viewing the CM can be separated from the terminal for use in viewing the content.

Next, a ninth exemplary embodiment of the present invention will be described below.

The ninth exemplary embodiment is characterized in that, if he content data matches plural reproduction conditions of the reproduction rule 110, the reproduction rule evaluation and execution unit 14 enables the user to select a reproduction rule 110 to be executed from the plurality of reproduction rules 110 of which reproduction conditions the content data matches.

In the case where the content data matches the reproduction conditions of the plurality of reproduction rules 110 as a result of the evaluation of the reproduction conditions of the reproduction rules 110, the reproduction rule evaluation and execution unit 14 may display all the reproduction rules 110 of which reproduction conditions the content data matches and have the user select. In this case, the reproduction rule evaluation and execution unit 14 performs processing in accordance with the reproduction rule selected by the user.

Consequently, it is possible to reproduce the content by the reproduction procedure in accordance with the viewer's taste.

It is obvious that the present invention is not limited to the above-described each exemplary embodiment and each exemplary embodiment can be changed and modified as appropriate within the scope and spirit of the present invention.

As described above, according to the present invention, the reproduction rule is evaluated at the time of reproducing the content, and the content and the CM can be reproduced depending on the dynamic condition. The reproduction procedure can be set depending on the reproduction rule 110 and the dynamic condition. Moreover, a content provider can variously set the reproduction rule 110 for the content. Furthermore, a user can reproduce the content in accordance with the various reproduction rules 110.

The invention claimed is:

1. A reproduction rule evaluation device comprising:
    hardware;
    a content object data input unit implemented at least by the hardware and configured to externally obtain a content object including a plurality of reproduction rules and a content data, wherein each of the plurality of reproduction rules is information describing a reproduction condition and a reproduction procedure of CM (Commercial Message) and content;
    an identifier management unit implemented at least by the hardware and configured to retain each of an identifier of a user, an identifier of a CM view terminal and an identifier of a content view terminal and provide said each identifier upon request; and
    a reproduction rule evaluation and execution unit implemented at least by the hardware and configured to obtain the plurality of reproduction rules in said content object, to perform an evaluation of reproduction conditions of the plurality of reproduction rules, to display the reproduction procedure of CM and content of matched reproduction rules whose reproduction conditions are matched as a result of the evaluation out of the plurality of reproduction rules to have said user select a given reproduction rule, to perform processing in accordance with the given reproduction rule selected by said user, to externally obtain a CM data, and to store a CM view history related to said identifier of the user when outputting the CM data; and an output control unit implemented at least by the hardware and configured to receive the CM data and the content data from said reproduction rule evaluation and execution unit, transmit the CM data to said CM view terminal based on said identifier of the CM view terminal, and transmit the content data to said content view terminal based on said identifier of the content view terminal.

2. The reproduction rule evaluation device according to claim 1, further comprising:

a reproduction unit configured to reproduce the CM data and the content data received from said reproduction rule evaluation and execution unit; and a CM view history retention unit configured to retain the CM view history related to said identifier of the user and provide the CM view history upon request, wherein said reproduction rule evaluation and execution unit transmits said identifier of the user obtained from said identifier management unit to said CM view history retention unit, obtains the CM view history related to said identifier of the user from said CM view history retention unit, transmits the CM data and the content data to said reproduction unit in a case where a CM is unviewed, and transmits the content data to said reproduction unit in a case where the CM is already viewed.

3. The reproduction rule evaluation device according to claim 1, wherein said content object further includes a CM data, and wherein when the CM data is required to be reproduced, said reproduction rule evaluation and execution unit obtains the CM data in said content object.

4. The reproduction rule evaluation device according to claim 1, further comprising: an output unit configured to receive the content data from said reproduction rule evaluation and execution unit and transmits the content data to another terminal in a case where a CM is already viewed.

5. The reproduction rule evaluation device according to claim 1, further comprising: an image quality change unit configured to, depending on said CM view history, receive the content data and an instruction to change image quality of content from said reproduction rule evaluation and execution unit, change the image quality of content, and return it back to said reproduction rule evaluation and execution unit.

6. The reproduction rule evaluation device according to claim 1, further comprising: a DRM setting change unit configured to receive the content data and an instruction to change DRM (Digital Rights Management) setting of content from said reproduction rule evaluation and execution unit, change the DRM setting, and return it back to said reproduction rule evaluation and execution unit.

7. The reproduction rule evaluation device according to claim 1, further comprising: a questionnaire answer history retention unit in which a questionnaire answer history related to said identifier of the user is stored, wherein said reproduction rule evaluation and execution unit refers to said questionnaire answer history to execute the reproduction rule that depends on whether or not a questionnaire is already answered.

8. The reproduction rule evaluation device according to claim 1, further comprising: a merchandise purchase data retention unit in which a merchandise purchase history related to said identifier of the user is stored, wherein said reproduction rule evaluation and execution unit refers to said merchandise purchase history to execute the reproduction rule that depends on whether or not said user purchased merchandise.

9. The reproduction rule evaluation device according to claim 1, wherein said content object data input unit obtains said content object from a content seller server via a network, and wherein said reproduction rule evaluation and execution unit obtains said CM data from said content seller server via said network and stores said CM view history in said content seller server.

10. A reproduction rule evaluation method comprising:

externally obtaining, by a computing device, a content object including a plurality of reproduction rules and a content data to evaluate reproduction conditions of the plurality of reproduction rules in said content object, wherein each of the plurality of reproduction rules is information describing a reproduction condition and a reproduction procedure of CM (Commercial Message) and content;

displaying, by the computing device, the reproduction procedure of CM and content of matched reproduction rules whose reproduction conditions are matched as a result of the evaluation out of the plurality of reproduction rules to have said user select a given reproduction rule;

performing, by the computing device, processing in accordance with the given reproduction rule selected by said user;

retaining, by the computing device, each of an identifier of a user, an identifier of a CM view terminal and an identifier of a content view terminal to provide said each identifier upon request;

obtaining, by the computing device, a CM view history related to said identifier of the user to evaluate the CM view history;

externally obtaining, by the computing device, a CM data, if a CM is unviewed as a result of the evaluation of the CM view history, to transmit the CM data to said CM view terminal based on said identifier of the CM view terminal and write said identifier of the user and view history information indicating that the CM is viewed to the CM view history; and obtaining, by the computing device, the content data from said content object to transmit the content data to said content view terminal based on said identifier of the content view terminal.

11. The reproduction rule evaluation method according to claim 10, further comprising: obtaining the CM data stored in said content object if the CM data is required to be reproduced.

12. The reproduction rule evaluation method according to claim 10, further comprising: transmitting the content data to another terminal in a case where a CM is already viewed.

13. The reproduction rule evaluation method according to claim 10, further comprising: receiving the content data and an instruction to change image quality of content to change the image quality of content, depending on said CM view history.

14. The reproduction rule evaluation method according to claim 10, further comprising: changing DRM setting based on the content data and an instruction to change DRM (Digital Rights Management) setting of content.

15. The reproduction rule evaluation method according to claim 10, further comprising: referring to a questionnaire answer history related to said identifier of the user to execute a reproduction rule that depends on whether or not a questionnaire is already answered.

16. The reproduction rule evaluation method according to claim 10, further comprising: referring to a merchandise purchase history related to said identifier of the user to execute a reproduction rule that depends on whether or not said user of said terminal purchased merchandise.

17. The reproduction rule evaluation method according to claim 10, further comprising:
    when obtaining said content object, obtaining said content object from a content seller server via a network, and
    when obtaining said CM data, obtaining said CM data from said content seller server via said network and storing said CM view history in said content seller server.

18. A non-transitory recording medium that stores a program that causes a computer to perform:
    externally obtaining a content object including a plurality of reproduction rules and a content data to evaluate reproduction conditions of the plurality of reproduction rules in said content object, wherein each of the plurality of reproduction rules is information describing a reproduction condition and a reproduction procedure of CM (Commercial Message) and content;
    displaying the reproduction procedure of CM and content of matched reproduction rules whose reproduction conditions are matched as a result of the evaluation out of the plurality of reproduction rules to have said user select a given reproduction rule;
    performing processing in accordance with the given reproduction rule selected by said user;
    retaining each of an identifier of a user, an identifier of a CM view terminal and an identifier of a content view terminal to provide said each identifier upon request;
    obtaining a CM view history related to said identifier of the user to evaluate the CM view history;
    externally obtaining a CM data, if a CM is unviewed as a result of the evaluation of the CM view history, to transmit the CM data to said CM view terminal based on said identifier of the CM view terminal and write said identifier of the user and view history information indicating that the CM is viewed to the CM view history; and
    obtaining the content data from said content object to transmit the content data to said content view terminal based on said identifier of the content view terminal.

* * * * *